United States Patent
Tokura et al.

(10) Patent No.: US 9,476,368 B2
(45) Date of Patent: Oct. 25, 2016

(54) CONTROL DEVICE FOR VEHICLE DRIVE DEVICE

(75) Inventors: Takaaki Tokura, Nagoya (JP); Masato Kaigawa, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 67 days.

(21) Appl. No.: 14/378,452

(22) PCT Filed: Mar. 2, 2012

(86) PCT No.: PCT/JP2012/055483
§ 371 (c)(1),
(2), (4) Date: Aug. 13, 2014

(87) PCT Pub. No.: WO2013/128649
PCT Pub. Date: Sep. 6, 2013

(65) Prior Publication Data
US 2015/0038292 A1    Feb. 5, 2015

(51) Int. Cl.
F02D 23/00 (2006.01)
F02M 35/10 (2006.01)
(Continued)

(52) U.S. Cl.
CPC ............ F02D 23/005 (2013.01); B60W 10/06 (2013.01); B60W 10/11 (2013.01); F02D 23/00 (2013.01);
(Continued)

(58) Field of Classification Search
CPC ..................... F02D 23/005; Y10T 477/55
See application file for complete search history.

(56) References Cited

U.S. PATENT DOCUMENTS

| 2011/0045948 A1* | 2/2011 | Doering | F02D 41/023 477/33 |
| 2012/0180759 A1* | 7/2012 | Whitney | F02D 13/0219 123/406.23 |
| 2013/0045832 A1* | 2/2013 | Whitney | F02D 41/023 477/3 |

FOREIGN PATENT DOCUMENTS

| CN | 101994582 A | 3/2011 |
| JP | 02-197431 A | 8/1990 |

(Continued)

OTHER PUBLICATIONS

International Search Report issued Apr. 3, 2012 in PCT/JP2012/055483 filed Mar. 2, 2012.

*Primary Examiner* — Justin Holmes
*Assistant Examiner* — Stacey Fluhart
(74) *Attorney, Agent, or Firm* — Oblon, McClelland, Maier & Neustadt, L.L.P

(57) ABSTRACT

A control device of a vehicle drive device includes an engine having a supercharger and an automatic transmission outputting power of the engine to drive wheels, when a supercharging pressure at the end of the upshift is increased as compared to the start of the upshift such that an engine torque at an end of an upshift of the automatic transmission is made larger than that at a start of the upshift, a target supercharging pressure being set depending on a predicted engine operation state after the upshift to allow a shift operation to proceed while an increase of the supercharging pressure is started before a completion of the upshift such that the supercharging Pressure reaches the target supercharging pressure, the supercharging pressure being controlled such that a target engine torque determined based on a vehicle state is achieved, and when the supercharging pressure cannot be increased in the upshift before the end of the upshift to a magnitude required for generating the target engine torque at the end of the upshift, a predefined engine torque lower than the target engine torque at the end of the upshift being retained after the end of the upshift.

3 Claims, 5 Drawing Sheets

(51) Int. Cl.
- *F02D 29/02* (2006.01)
- *F02D 41/02* (2006.01)
- *F02D 41/00* (2006.01)
- *B60W 10/06* (2006.01)
- *B60W 10/11* (2012.01)
- *F02D 41/10* (2006.01)
- *B60W 30/19* (2012.01)

(52) U.S. Cl.
CPC ........... *F02D 29/02* (2013.01); *F02D 41/0007* (2013.01); *F02D 41/023* (2013.01); *F02M 35/1038* (2013.01); *B60W 30/19* (2013.01); *F02D 41/10* (2013.01); *F02D 2200/0406* (2013.01); *F02D 2250/18* (2013.01); *F02D 2250/21* (2013.01); *F02D 2250/26* (2013.01); *Y02T 10/144* (2013.01); *Y10T 477/55* (2015.01)

(56) References Cited

FOREIGN PATENT DOCUMENTS

| | | |
|---|---|---|
| JP | 05-086918 A | 4/1993 |
| JP | 2006-138391 A | 6/2006 |

\* cited by examiner

|  | C1 | C2 | B1 | B2 | B3 | F1 |
|---|---|---|---|---|---|---|
| 1st | ○ |  |  | ◎ |  | △ |
| 2nd | ○ |  | ○ |  |  |  |
| 3rd | ○ |  |  |  | ○ |  |
| 4th | ○ | ○ |  |  |  |  |
| 5th |  | ○ |  |  | ○ |  |
| 6th |  | ○ | ○ |  |  |  |
| R |  |  |  | ○ | ○ |  |
| N |  |  |  |  |  |  |

◎ ACTUATED DURING ENGINE BRAKE
△ ACTUATED ONLY DURING DRIVE

CONTROL DEVICE FOR VEHICLE DRIVE DEVICE

TECHNICAL FIELD

The present invention relates to a technique of improving drivability in a vehicle including an engine with a supercharger and an automatic transmission.

BACKGROUND ART

A control device of a vehicle drive device including an engine with a supercharger and an automatic transmission is conventionally well known. For example, this corresponds to a shift control device of Patent Document 1. The shift control device inhibits an upshift of the automatic transmission while a detected supercharging pressure is equal to or less than a supercharging pressure target value and performs the upshift after delaying the upshift until the supercharging pressure increases.

PRIOR ART DOCUMENTS

Patent Documents

Patent Document 1: Japanese Laid-Open Patent Publication No. 2-197431
Patent Document 2: Japanese Laid-Open Patent Publication No. 2006-138391

SUMMARY OF THE INVENTION

Problem to be Solved by the Invention

However, if a start of the shift operation of the automatic transmission is delayed, a drive force request from a driver may not be satisfied. On the other hand, if the increase in the supercharging pressure and the shift operation are allowed to proceed as quickly as possible, vehicle's acceleration performance is improved; however, shift shock is likely to expand. The upshift may be delayed or not depending on a degree of the supercharging pressure and, therefore, for example, even in the same running state and the same accelerator operation, the engine rotation speed before and after the upshift differs each time an accelerator operation is performed. Therefore, the shift control device of patent document 1 may deteriorate drivability. Such a problem is unknown.

The present invention was conceived in view of the situations and it is therefore an object of the present invention to provide a control device of a vehicle drive device capable of improving drivability in a vehicle drive device including an engine with a supercharger and an automatic transmission.

Means for Solving the Problem

To achieve the object, the first aspect of the invention provides (a) a control device of a vehicle drive device including an engine having a supercharger and an automatic transmission outputting power of the engine to drive wheels, characterized in that (b) when a supercharging pressure at the end of the upshift is increased as compared to the start of the upshift such that an engine torque at an end of an upshift of the automatic transmission is made larger than that at a start of the upshift, a target supercharging pressure is set depending on a predicted engine operation state after the upshift to allow a shift operation to proceed while an increase of the supercharging pressure is started before a start of an inertia phase of the upshift such that the supercharging pressure reaches the target supercharging pressure.

Effects of the Invention

Consequently, although a temporal delay occurs in an increase in the supercharging pressure, the increase in the supercharging pressure is started early before the completion (before the end) of the upshift and, therefore, a request for drive force from a driver can more easily be satisfied at the end of the upshift. As compared to when the increase in the supercharging pressure is started after the upshift ends, it is more easily avoided or suppressed that the drive force is not made sufficiently larger at the end of the upshift and that the drive force is made larger with a delay from the end of the upshift and, as a result, a sense of discomfort given to a driver can be reduced. Thus, drivability at the time of the upshift can be improved.

As described in the first aspect of the invention, as compared to when the increase in the supercharging pressure is started after the start of the inertia phase, a sufficient grace period for increasing the supercharging pressure before the end of the upshift can easily be ensured.

The second aspect of the invention provides the control device of a vehicle drive device recited in the first aspect of the invention, wherein (a) the supercharging pressure is controlled such that a target engine torque determined based on a vehicle state is achieved, and wherein (b) when the supercharging pressure cannot be increased in the upshift before the end of the upshift to a magnitude required for generating the target engine torque at the end of the upshift, a predefined engine torque lower than the target engine torque at the end of the upshift is retained after the end of the upshift. Consequently, it is avoided that the drive force is made larger with a delay from the end of the upshift in accordance with an increase in the supercharging pressure and, as a result, a sense of discomfort given to a driver can be reduced.

The third aspect of the invention provides the control device of a vehicle drive device recited in the second aspect of the invention, wherein the predefined engine torque is retained until the target engine torque is reduced to be equal to or less than the predetermined engine torque after the end of the upshift. Consequently, after the end of the upshift, the drive force can smoothly be changed while a sense of discomfort given to a driver is suppressed.

Preferably, the supercharging pressure at the end of the upshift is presumed from a predefined relationship based on a shift stage (gear ratio) of the automatic transmission established after the upshift and a current vehicle state. For example, the supercharging pressure at the end of the upshift is presumed before the start of the inertia phase of the upshift.

Preferably, when the supercharging pressure at the end of the upshift is increased as compared to the start of the upshift such that an engine torque at the end of an upshift of the automatic transmission is made larger than that at the start of the upshift, the shift operation is allowed to proceed while the increase in the supercharging pressure is started before completion of the upshift, and the start time and the end time of the upshift are kept regardless of the supercharging pressure. In short, the increase in the supercharging pressure is started before completion of the upshift without changing a shift timing of the upshift.

Preferably, the case of increasing the supercharging pressure at the end of the upshift as compared to the start of the upshift is the case that the engine is changed from a non-supercharged state to the supercharged state during the upshift. Alternatively, this is the case that when the engine is in the supercharged state at the start of the upshift, the supercharging pressure is increased during the upshift in the supercharged state.

Preferably, the control device determines the target engine torque so as to acquire a drive force in accordance with a drive force characteristic map predefined such that a drive force becomes smaller when a vehicle speed is higher regardless of whether the automatic transmission is at the time of a shift or not at the time of a shift, and controls the engine so as to acquire the target engine torque.

MODE FOR CARRYING OUT THE INVENTION

An example of the present invention will now be described in detail with reference to the drawings.

Example

Figures 1, 2:
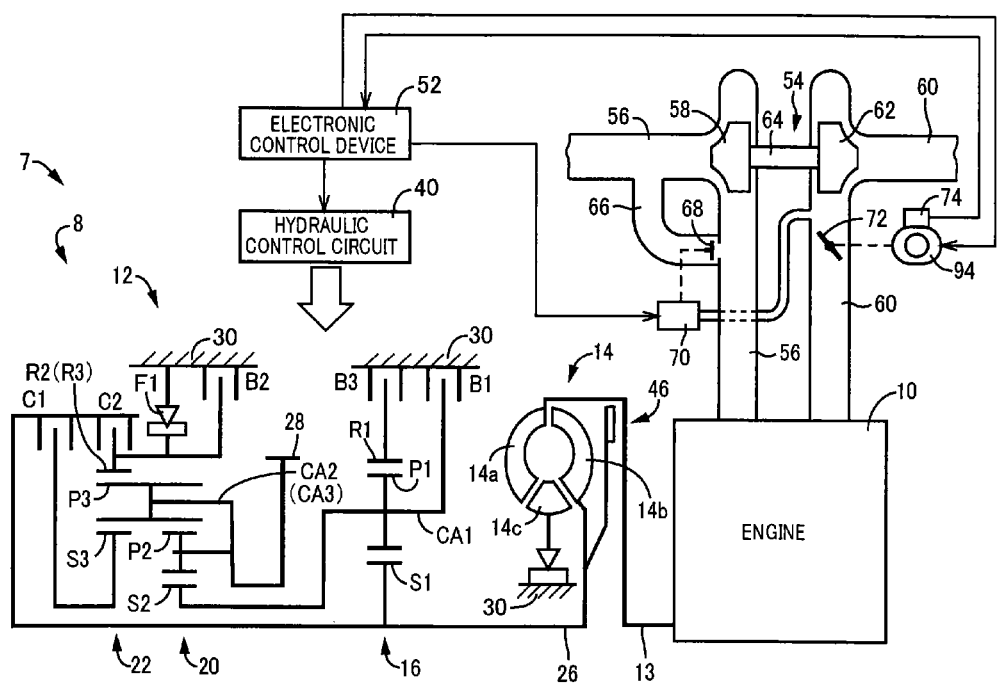
FIG. 1 is a schematic for explaining a configuration of a vehicle drive device included in a vehicle to which the present invention is preferably applied.
FIG. 2 is an operation table for explaining operation states of engagement elements when a plurality of shift stages (gear stages) are established in the automatic transmission included in the vehicle drive device of FIG. 1.

FIG. 1 is a schematic for explaining a configuration of a vehicle drive device 7 included in a vehicle 6 to which the present invention is preferably applied. The vehicle 6 includes the vehicle drive device 7, a pair of drive wheels 38, etc., and the vehicle drive device 7 includes a vehicle power transmission device 8 (hereinafter referred to as a "power transmission device 8") and an engine 10. The power transmission device 8 is interposed between the engine 10 and the drive wheels 38 and includes an automatic transmission 12 and a torque converter 14 coupled to an output shaft 13 of the engine 10 and interposed between the engine 10 and the automatic transmission 12. The power transmission device 8 is preferably used in an FF vehicle in which the power transmission device 8 is equipped in the lateral direction of (transversely mounted on) the vehicle 6 (see FIG. 3).

The automatic transmission 12 makes up a portion of a power transmission path from the engine 10 to the drive wheels 38 (see FIG. 3) and outputs power of the engine 10 toward the drive wheels 38. Therefore, the power of the engine 10 input to a transmission input shaft 26 is output from an output gear 28 toward the drive wheels 38. The automatic transmission 12 is a stepped transmission including a plurality of planetary gear devices 16, 20, 22, a plurality of hydraulic friction engagement devices (clutches C and brakes B), or specifically, five hydraulic friction engagement devices (C1, C2, B1, B2, B3), and a one-way clutch F1, and selectively establishing a plurality of shift stages (gear stages) by switching any of the multiple hydraulic friction engagement devices to be gripped. For example, the automatic transmission 12 performs a shift in accordance with a relationship (shift diagram) set in advance based on a vehicle state represented by a vehicle speed V and an accelerator opening degree Acc. In short, the automatic transmission 12 is a stepped transmission performing a so-called clutch-to-clutch shift frequently used in typical vehicles. Specifically, the first planetary gear device 16 of the automatic transmission 12 is of a single pinion type and includes a first sun gear S1, a first pinion gear P1, a first carrier CA1, and a first ring gear R1. The second planetary gear device 20 is of a double pinion type and includes a second sun gear S2, a second pinion gear P2, a third pinion gear P3, a second carrier CA2, and a second ring gear R2. The third planetary gear device 22 is of a single pinion type and includes a third sun gear S3, the third pinion gear P3, a third carrier CA3, and a third ring gear R3. The second planetary gear device 20 and the third planetary gear device 22 are formed as a Ravigneaux type planetary gear train with the second and third ring gears R2 and R3 made up of a common member and the third pinion gear P3 of the third planetary gear device 22 used also as one of the pinion gears of the second planetary gear device 20. As can be seen from FIG. 1, the transmission input shaft 26 acting as an input rotating member of the automatic transmission 12 is a turbine shaft of the torque converter 14. The output gear 28 acting as an output rotating member of the automatic transmission 12 functions as a differential drive gear meshed with a differential driven gear (large diameter gear) 34 of a differential gear device 32 (see FIG. 3). An output of the engine 10 is transmitted through the torque converter 14, the automatic transmission 12, the differential gear device 32, and a pair of axles 36 to a pair of the drive wheels (front wheels) 38 (see FIG. 3). The automatic transmission 12 is substantially symmetrically configured relative to a center line and the lower half from the center line is not depicted in FIG. 1.

FIG. 2 is an operation table for explaining operation states of engagement elements when a plurality of shift stages (gear stages) are established in the automatic transmission 12. An operation table of FIG. 2 summarizes a relationship between the shift stages and operation states of the clutches C1, C2, and the brakes B1 to B3 with "circles" indicative of engagement, a "double circle" indicative of engagement only during engine brake, and a "triangle" indicative of engagement only during drive. As depicted in FIG. 2, the automatic transmission 12 has six forward shift stages from a first speed gear stage "1st" to a sixth speed gear stage "6th" and a reverse shift stage of a reverse shift stage "R" established depending on the operation states of the engagement elements (the clutches C1, C2, and the brakes B1 to B3). Since the one-way F1 is disposed in parallel with the brake B2 establishing the first shift stage "1st", the brake B2 may not necessarily be engaged at startup (at the time of acceleration). A gear ratio γat of the automatic transmission 12 is calculated based on an input rotation speed Nin that is a rotation speed Nin of the transmission input shaft 26 and an output rotation speed Nout that is a rotation speed Nout of the output gear 28 from an equation "gear ratio γat=input rotation speed Nin/output rotation speed Nout".

The clutches C1, C2, and the brakes B1 to B3 (hereinafter simply referred to as clutches C and brakes B if not particularly distinguished) are hydraulic friction engagement devices subjected to engagement control by hydraulic actuators, such as multiplate clutches and brakes, and have engaged and released states switched, and transient oil pressures at the time of engagement and release controlled, by excitation/non-excitation and current control of a linear solenoid valve disposed in a hydraulic control circuit 40 (see FIG. 1).

The torque converter 14 includes a pump impeller 14a coupled to the output shaft (crankshaft) 13 of the engine 10, a turbine impeller 14b coupled to the transmission input shaft 26 of the automatic transmission 12, and a stator impeller 14c coupled via the one-way clutch to a housing (transmission case) 30 of the automatic transmission 12 and is a fluid transmission device transmitting the power generated by the engine 10 through fluid to the automatic transmission 12. A lockup clutch 46 is a direct clutch disposed between the pump impeller 14a and the turbine impeller 14b and is put into an engaged state, a slip state, or a released state through hydraulic control etc. The lockup clutch 46 is put into an engaged state, or strictly, a completely engaged state, to integrally rotate the pump impeller 14a and the turbine impeller 14b.

The engine 10 is an internal combustion engine such as a diesel engine or a gasoline engine, and includes a supercharger 54. The supercharger 54 is disposed in an intake system of the engine 10 and is a known exhaust turbine supercharger, i.e., a turbocharger, rotationally driven by exhaust of the engine 10 to pressurize intake air of the engine 10. Specifically, as depicted in FIG. 1, the supercharger 54 includes an exhaust turbine wheel 58 disposed in an exhaust pipe 56 of the engine 10 and rotationally driven by exhaust of the engine 10, an intake compressor wheel 62 disposed in an intake pipe 60 of the engine 10 and rotated by the exhaust turbine wheel 58 to compress intake air of the engine 10, and a rotation shaft 64 coupling the exhaust turbine wheel 58 and the intake compressor wheel 62. When the exhaust of the engine 10 sufficient for driving the supercharger 54 is led to the exhaust turbine wheel 58, the engine 10 operates in a supercharged state in which the engine 10 is supercharged by the supercharger 54. On the other hand, if the exhaust of the engine 10 led to the exhaust turbine wheel 58 is insufficient for driving the supercharger 54, the supercharger 54 is almost not driven and the engine 10 operates in a state of supercharging suppressed as compared to the supercharged state, i.e., a natural aspiration state (also referred to as NA state or a non-supercharged state), which is a state of intake air equivalent to a natural aspirated engine without the supercharger 54.

Additionally, an exhaust bypass path 66 is disposed in parallel with an exhaust path in which the exhaust turbine wheel 58 in the exhaust pipe 56 is disposed, and a waist gate valve 68 is disposed that opens and closes the exhaust bypass path 66. The waist gate valve 68 has an opening degree θwg of the waist gate valve 68 (hereinafter referred to as a waist gate valve opening degree θwg) made continuously adjustable, and an electronic control device 52 controls an electric actuator 70 to continuously open and close the waist gate valve 68 by utilizing pressure in the intake pipe 60. For example, when the waist gate valve opening degree θwg is larger, the exhaust of the engine 10 is more easily discharged through the exhaust bypass path 66 and, therefore, if exhaust from an exhaust port of the engine 10 is acquired to the extent that the engine 10 can be put into the supercharged state, a downstream air pressure PLin of the intake compressor wheel 62 in the intake pipe 60, i.e., a supercharging pressure Pcmout (=PLin) of the supercharger 54, becomes lower when the waist gate valve opening degree θwg is larger. Therefore, the waist gate valve 68 acts as a supercharging pressure adjusting device adjusting the supercharging pressure Pcmout. For example, a supercharging operation map is empirically set in advance with a region divided into a supercharging area, i.e., an operating range (range of an engine operating point) for putting the engine 10 into the supercharged area, and a non-supercharging area, i.e., an operation range set on a lower engine torque side relative to the supercharging area for putting the engine 10 into the non-supercharged state. If an operating point of the engine 10 (engine operating point) represented by an engine rotation speed Ne and an engine torque Te is moved from the non-supercharging area to the supercharging area, the electronic control device 52 actuates the waist gate valve 68 in the closing direction, thereby causing the supercharger 54 to perform the supercharging. Conversely, if the engine operating point is moved from the supercharging area to the non-supercharging area, the electronic control device 52 actuates the waist gate valve 68 in the opening direction, thereby stopping or suppressing the supercharging by the supercharger 54. The supercharging operation map is set such that a supercharging pressure target value PTcmout (target supercharging pressure PTcmout) is defined depending on the engine operating point in the supercharging area, and the electronic control device 52 sequentially defines the supercharging pressure target value PTcmout (target supercharging pressure PTcmout) from the supercharging operation map in the supercharging area to control the waist gate valve opening degree θwg or a throttle opening degree θth such that the supercharging pressure Pcmout is brought closer to the target supercharging pressure PTcmout. The supercharging operation map is empirically set in advance so as to acquire a largest possible drive force Fc in accordance with a driver's request, for example, and to suppress deterioration in fuel efficiency of the vehicle 6 as far as possible. In the supercharging operation map, for example, the target supercharging pressure PTcmout becomes larger when the engine torque Te used as a parameter of the map is larger. The drive force Fc is a propulsive force propelling the vehicle 6 in the traveling direction.

The engine 10 includes an electronic throttle valve 72. The electronic throttle valve 72 is a valve mechanism disposed downstream side of the intake compressor wheel 62 in the intake pipe 60 of the engine 10 to adjust an intake air amount of the engine 10 and is actuated to open/close by an electric throttle actuator 94.

Figure 3:
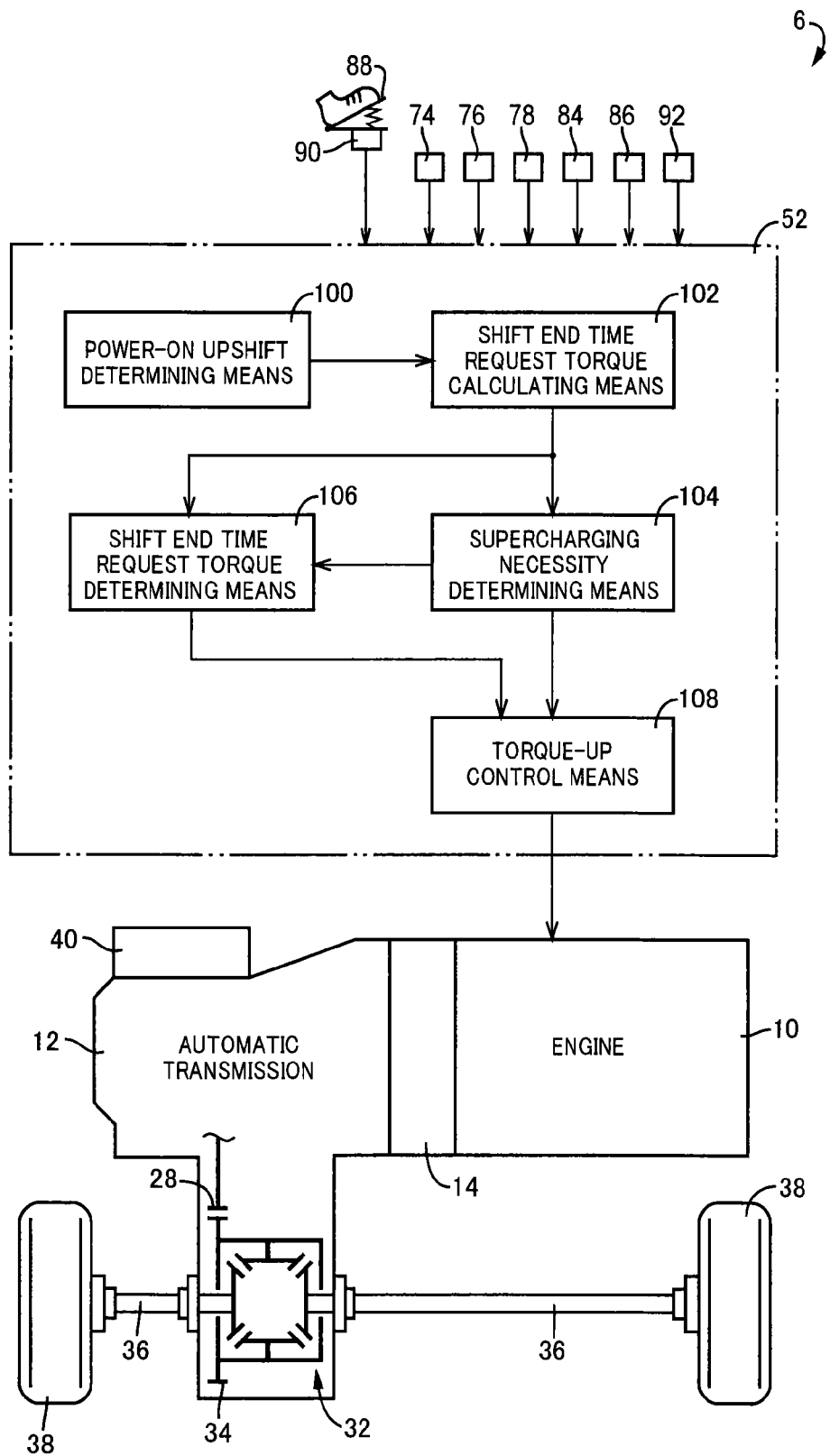
FIG. 3 is a diagram of exemplary illustration of signals input to an electronic control device for controlling the vehicle drive device of FIG. 1 and is a functional block diagram for explaining a main portion of a control function included in the electronic control device.

FIG. 3 is a diagram of exemplary illustration of signals input to the electronic control device 52 acting as a control device for controlling the vehicle drive device 7 of this example and is a functional block diagram for explaining a main portion of a control function included in the electronic control device 52. The electronic control device 52 includes a so-called microcomputer and executes signal processes in accordance with programs stored in advance to provide vehicle control related to the engine 10 and the automatic transmission 12.

The electronic control device 52 is supplied, from sensors, switches, etc. as depicted in FIG. 3, with a signal indicative of the opening degree θth of the electronic throttle valve 72, i.e., the throttle opening degree θth, detected by a throttle opening degree sensor 74, a signal indicative of an upstream air pressure PHin of the intake compressor wheel 62 in the intake pipe 60 detected by a first intake sensor 76, a signal indicative of the downstream air pressure PLin (=supercharging pressure Pcmout) of the intake compressor wheel 62 in the intake pipe 60 detected by a second intake sensor (supercharging pressure sensor) 78, a signal indicative of the engine rotation speed Ne detected by an engine rotation speed sensor 84, a signal indicative of the rotation speed Nout of the output gear 28 detected by an output rotation speed sensor 86, a signal from an accelerator opening degree sensor 90 indicative of the accelerator opening degree Acc that is an operation amount of an accelerator pedal 88 corresponding to a request output of a driver, a signal from a turbine rotation speed sensor 92 indicative of a rotation speed Nt of the turbine impeller 14b (hereinafter referred to as "turbine rotation speed Nt"), i.e., the rotation speed Nin (=Nt) of the transmission input shaft 26, etc. Since the rotation speed Nout of the output gear 28 corresponds to the vehicle speed V, the output rotation speed sensor 86 also acts as a vehicle speed sensor detecting the vehicle speed V. Since the compressor upstream intake pressure PHin is the same as an atmospheric pressure Pair, the first intake sensor 76 also acts as an atmospheric pressure sensor detecting the atmospheric pressure Pair.

The electronic control device 52 supplies various output signals to the devices disposed on the vehicle 6. For example, the electronic control device 52 sequentially calculates a target engine torque Tet that is a target value of the engine torque Te so as to acquire the drive force Fc in accordance with a predefined drive force characteristic map based on the accelerator opening degree Acc and the vehicle speed V regardless of whether the automatic transmission 12 is at the time of the shift or not at the time of the shift. Therefore, the target engine torque Tet is determined based on a vehicle state such as the accelerator opening degree Acc and the vehicle speed V. In the drive force characteristic map, the drive force Fc becomes smaller when the vehicle speed V is higher or when the accelerator opening degree Acc is smaller. When determining the target engine torque Tet, the electronic control device 52 sets the target supercharging pressure PTcmout from the supercharging operation map based on the engine operating point defined by the engine rotation speed Ne and the target engine torque Tet. In other words, the target supercharging pressure PTcmout is set from the supercharging operation map depending on an operation state of the engine 10 represented by the engine rotation speed Ne and the target engine torque Tet. The electronic control device 52 controls one or both of the waist gate valve opening degree θwg and the throttle opening degree θth so as to bring the supercharging pressure Pcmout closer to the target supercharging pressure PTcmout and to acquire the determined target engine torque Tet. Therefore, from the view point of the supercharging pressure Pcmout, the electronic control device 52 uses the supercharging operation map to control the supercharging pressure Pcmout such that the target engine torque Tet is acquired. In such a control of the engine 10, the target engine torque Tet at the end of the shift is determined such that the drive force Fc at the end of the shift is set to a magnitude conforming to the drive force characteristic map given that the automatic transmission 12 is at the time of the shift.

It is generally known that a temporal delay occurs in an increase in the supercharging pressure Pcmout. If an upshift of the automatic transmission 12 is performed by executing an acceleration operation such as depressing the accelerator pedal 88, i.e., if a power-on upshift is performed that is an upshift during vehicle acceleration, the supercharging pressure Pcmout may be increased during the upshift. If the supercharging pressure Pcmout is increased during the upshift in this way, control of the supercharging pressure Pcmout is provided with consideration given to a delay of increase in the supercharging pressure Pcmout. A main portion of the control function will be described with reference to FIG. 3.

As depicted in FIG. 3, the electronic control device 52 functionally includes a power-on upshift determining means 100 that is a power-on upshift determining portion, a shift end time request torque calculating means 102 that is a shift end time request torque calculating portion, a supercharging necessity determining means 104 that is a supercharging necessity determining portion, a shift end time request torque determining means 106 that is a shift end time request torque determining portion, and a torque-up control means 108 that is a torque-up control portion.

The power-on upshift determining means 100 determines whether the power-on upshift is performed. Therefore, the power-on upshift determining means 100 sequentially detects the accelerator opening degree Acc and the vehicle speed V and sequentially acquires a request torque to the engine 10, i.e., the target engine torque Tet, from the predefined drive force characteristic map based on the gear ratio γat of the automatic transmission 12, the accelerator opening degree Acc, and the vehicle speed V. In addition to the acquisition of the target engine torque Tet, the power-on upshift determining means 100 sequentially determines whether an upshift of the automatic transmission 12 is performed. Specifically, the electronic control device 52 makes a shift determination of performing a shift of the automatic transmission 12 based on the vehicle speed V and the accelerator opening degree Acc from the predefined shift diagram and performs a shift of the automatic transmission 12 after making the shift determination in accordance with the shift determination and, therefore, for example, the power-on upshift determining means 100 determines that the upshift of the automatic transmission 12 is performed if the shift determination of performing the upshift of the automatic transmission 12 is made from the shift diagram. If it is determined that an upshift of the automatic transmission 12 is performed as described above and that the target engine torque Tet exceeds a power-on determination value predefined for determining an acceleration operation of a driver, the power-on upshift determining means 100 determines that the power-on upshift is performed. Since the gear ratio γat is made smaller by an upshift of the automatic transmission 12, the engine torque Te at the end of the upshift is made larger than that at the start of the upshift in the power-on upshift so as to prevent a driver from becoming aware of reduction in drive force due to the upshift. Therefore, if it is determined that the power-on upshift is performed, in other words, this means that the electronic control device 52 makes the engine torque Te at the end of the upshift of the automatic transmission 12 larger than that at the start of the upshift.

If the power-on upshift determining means 100 determines that the power-on upshift is performed, the shift end time request torque calculating means 102 estimates the target engine torque Tet (predicted value) at the end of the upshift. Specifically, when estimating the target engine torque Tet at the end of the upshift, the shift end time request torque calculating means 102 first calculates a target value Fct of the drive force Fc at the end of the upshift, i.e., a target drive force Fct (predicted value) at the end of the upshift, from the drive force characteristic map based on the current vehicle speed V, the vehicle acceleration, and the accelerator opening degree Acc on the assumption that the accelerator opening degree Acc is retained, for example. The shift end time request torque calculating means 102 calculates the engine torque Te realizing the calculated target drive force Fct at the end of the upshift, as the target engine torque Tet at the end of the upshift. Although the target engine torque Tet at the end of the upshift may be estimated at any time point after the time of shift determination of performing the upshift before the end of the upshift or may sequentially be estimated within this period, the target engine torque Tet at the end of the upshift is preferably estimated before the start of the inertia phase of the upshift.

When the shift end time request torque calculating means 102 estimates the target engine torque Tet at the end of the upshift, the supercharging necessity determining means 104 determines whether the supercharging pressure Pcmout at the end of the upshift is increased as compare to the start of the upshift in the power-on upshift, based on the estimated target engine torque Tet at the end of the upshift. In other words, the supercharging necessity determining means 104 determines whether the supercharging pressure Pcmout must be increased as compared to the start of the upshift so as to realize the estimated target engine torque Tet at the end of the upshift. Specifically, the supercharging necessity determining means 104 estimates the engine rotation speed Ne at the end of the upshift based on the engine rotation speed Ne before the start of the upshift or the current engine rotation speed Ne and the shift stages before and after the upshift. The supercharging necessity determining means 104 calculates the target supercharging pressure PTcmout at the end of the upshift from the supercharging operation map based on the estimated engine rotation speed Ne and the target engine torque Tet at the end of the upshift, i.e., a predicted operation state of the engine 10 (predicted engine operation state) represented by the engine rotation speed Ne and the target engine torque Tet at the end of the upshift. In other words, the target supercharging pressure PTcmout at the end of the upshift is set from a predefined relationship (the supercharging operation map and the drive force characteristic map) based on the shift stage of the automatic transmission 12 established after the upshift and a current vehicle state or a vehicle state before the start of the upshift. If the calculated target supercharging pressure PTcmout at the end of the upshift is higher than the supercharging pressure Pcmout at the start of the upshift, the supercharging necessity determining means 104 determines that the supercharging pressure Pcmout at the end of the upshift is increased as compared to the start of the upshift. Such a determination is assumed to be made in various situations. For example, if the engine 10 is in the non-supercharged state at the start of the upshift and it is determined from the supercharging operation map that the engine 10 must be changed to the supercharged state so as to realize the target engine torque Tet at the end of the upshift, i.e., if it is determined that the engine 10 is changed from the non-supercharged state to the supercharged state during the upshift, the supercharging necessity determining means 104 determines that the supercharging pressure Pcmout at the end of the upshift is increased as compared to the start of the upshift. Even when the engine 10 is already in the supercharged state at the start of the upshift, if it is determined from the supercharging operation map that the supercharging pressure Pcmout must be made higher at the end of the upshift than that at the start of the upshift so as to realize the target engine torque Tet at the end of the upshift, the supercharging necessity determining means 104 determines that the supercharging pressure Pcmout at the end of the upshift is increased as compared to the start of the upshift. Although the calculation of the target supercharging pressure PTcmout at the end of the upshift and the determination of the increase in the supercharging pressure Pcmout by the supercharging necessity determining means 104 may be performed at any time point after the time of shift determination of performing the upshift before the end of the upshift or may sequentially be performed within this period, the calculation and the determination are preferably performed before the start of the inertia phase of the upshift. If an engine control device providing various controls of the engine 10 is disposed, the supercharging operation map may preliminarily be stored in the engine control device and, in such a case, the determination of the supercharging necessity determining means 104 is made by the engine control device, or the target supercharging pressure PTcmout at the end of the upshift is acquired from the engine control device.

If the supercharging necessity determining means 104 determines that the supercharging pressure Pcmout at the end of the upshift is increased as compared to the start of the upshift, the shift end time request torque determining means 106 determines whether the supercharging pressure Pcmout can be increased before the end of the upshift to a magnitude required for generating the target engine torque Tet at the end of the upshift. Such a determination is made because the supercharging pressure Pcmout required for generating the target engine torque Tet at the end of the upshift may not be acquired until the end of the upshift depending on an increase width of the supercharging pressure Pcmout or the engine rotation speed Ne since a certain amount of time is required for the increase in the supercharging pressure Pcmout. The target engine torque Tet at the end of the upshift used in the determination of the shift end time request torque determining means 106 is a torque value estimated by the shift end time request torque calculating means 102. Specifically, to make the determination, the shift end time request torque determining means 106 first calculates a torque increase required time required until the target engine torque Tet at the end of the upshift is acquired. In particular, when a reference time point is set to a predetermined time point after the time of shift determination of performing the upshift before the end of the upshift, for example, to an upshift start time point, the torque increase required time is a time required from the reference time point until the target engine torque Tet at the end of the upshift is acquired. A torque increase required time map for calculating the torque increase required time is empirically set in advance. The torque increase required time is calculated from the torque increase required time map based on an engine torque increase width acquired by subtracting the engine torque Te at the reference time point from the target engine torque Tet at the end of the upshift, the engine rotation speed Ne and the supercharging pressure Pcmout at the reference time point, and the shift stages before and after the upshift.

The shift end time request torque determining means 106 calculates the torque increase required time and also calculates a shift required time required until the end of the upshift. The shift required time is a required time from the reference time as is the case with the torque increase required time. The shift required time is a time defined if the shift determination of performing the upshift is made, and therefore can be calculated any time after the time of shift determination.

The shift end time request torque determining means 106 calculates and acquires the torque increase required time and the shift required time and then compares the torque increase required time and the shift required time with each other. If the torque increase required time is longer than the shift required time as a result of the comparison, this means that the increase in the supercharging pressure Pcmout cannot be completed within the upshift and, therefore, the shift end time request torque determining means 106 determines that the supercharging pressure Pcmout cannot be increased before the end of the upshift to the magnitude required for generating the target engine torque Tet at the end of the upshift. In other words, the shift end time request torque determining means 106 determines that the required supercharging pressure Pcmout cannot be acquired before the end of the upshift. Conversely, if the torque increase required time is equal to or less than the shift required time, the shift end time request torque determining means 106 determines that the supercharging pressure Pcmout can be increased before the end of the upshift to the magnitude required for generating the target engine torque Tet at the end of the upshift. In other words, the shift end time request torque determining means 106 determines that the required supercharging pressure Pcmout can be acquired before the end of the upshift.

When the supercharging pressure Pcmout at the end of the upshift is increased as compared to the start of the upshift such that the engine torque Te at the end of the upshift of the automatic transmission 12 is made larger than that at the start of the upshift, the torque-up control means 108 provides supercharging pressure increase early start control of starting the increase in the supercharging pressure Pcmout before the completion (before the end) of the upshift so that the supercharging pressure Pcmout reaches the target supercharging pressure PTcmout defined from the predicted engine operation state at the end of the upshift. While the supercharging pressure increase early start control is provided, the electronic control device 52 causes shift operation of the automatic transmission 12 to proceed. The target supercharging pressure PTcmout defined from the predicted engine operation state at the end of the upshift is calculated and set by the supercharging necessity determining means 104 as described above. As described above, when it is determined that the power-on upshift is performed, this means that the electronic control device 52 makes the engine torque Te at the end of the upshift of the automatic transmission 12 larger than that at the start of the upshift. Therefore, when the supercharging pressure Pcmout at the end of the upshift is increased as compared to the start of the upshift such that the engine torque Te at the end of the upshift of the automatic transmission 12 is made larger than that at the start of the upshift, this corresponds to the case when the power-on upshift determining means 100 determines that the power-on upshift is performed and the supercharging necessity determining means 104 determines that the supercharging pressure Pcmout at the end of the upshift is increased as compared to the start of the upshift. Although the increase in the supercharging pressure Pcmout in the supercharging pressure increase early start control is preferably started before the start of the inertia phase of the upshift of the automatic transmission 12, the increase may be started after the start of the inertia phase.

When providing the supercharging pressure increase early start control in the upshift, the torque-up control means 108 varies the engine torque Te achieved at the end of the upshift depending on the determination by the shift end time request torque determining means 106. Specifically, if the shift end time request torque determining means 106 determines that the required supercharging pressure Pcmout can be acquired before the end of the upshift, the torque-up control means 108 starts the increase in the supercharging pressure Pcmout such that the supercharging pressure Pcmout reaches the target supercharging pressure PTcmout at the end of the upshift through the supercharging pressure increase early start control. The torque-up control means 108 also increases the engine torque Te such that the target engine torque Tet at the end of the upshift is acquired before the end of the upshift. For example, the torque-up control means 108 increases the engine torque Te so as to acquire the target engine torque Tet sequentially determined in accordance with a change in the engine rotation speed Ne.

On the other hand, if the shift end time request torque determining means 106 determines that the required supercharging pressure Pcmout cannot be acquired before the end of the upshift, the torque-up control means 108 calculates a predetermined engine torque T1et lower than the target engine torque Tet at the end of the upshift and the target supercharging pressure PTcmout corresponding to the predetermined engine torque T1et. The target engine torque Tet at the end of the upshift is a torque value estimated by the shift end time request torque calculating means 102 described above. The predetermined engine torque T1et is the maximum engine torque Te realizable before the end of the upshift and is calculated from a realizable torque map that is a empirically preset relationship, based on, for example, the shift required time as well as the supercharging pressure Pcmout, the engine torque Te, and the engine rotation speed Ne at the reference time point. For example, the predetermined engine torque T1et is calculated from the realizable torque map as a smaller torque when the shift required time is shorter or when the engine rotation speed Ne at the reference time point is lower. After calculating the predetermined engine torque T1et and the target supercharging pressure PTcmout corresponding thereto, the torque-up control means 108 replaces the target supercharging pressure PTcmout at the end of the upshift in the supercharging pressure increase early start control with a lower target supercharging pressure PTcmout corresponding to the predetermined engine torque T1et and then starts the increase in the supercharging pressure Pcmout through the supercharging pressure increase early start control to increase the supercharging pressure Pcmout and make the engine torque Te larger such that the predetermined engine torque T1et is acquired before the end of the upshift. When the predetermined engine torque T1et is acquired, the torque-up control means 108 retains the engine torque Te reaching the predetermined engine torque T1et without change even if the upshift ends. In other words, the predetermined engine torque T1et is retained after the end of the upshift. Since the predetermined engine torque T1et is lower than the target engine torque Tet at the end of the upshift, the torque-up control means 108 continues retaining the predetermined engine torque T1et until the target engine torque Tet is reduced to be equal to or less than the predetermined engine torque T1et after the end of the upshift.

Figure 4:
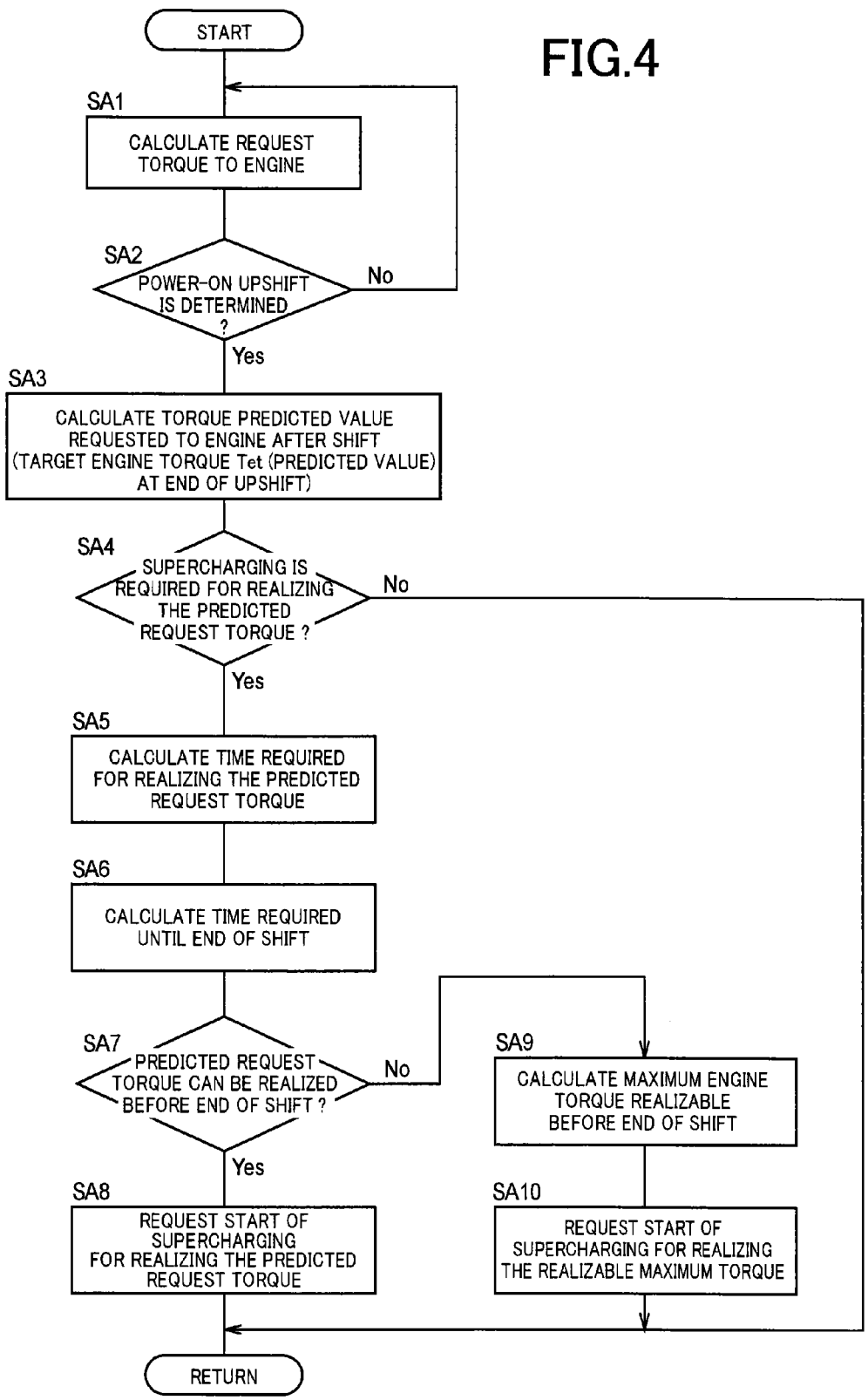
FIG. 4 is a flowchart for explaining a main portion of the control operation of the electronic control device of FIG. 3, i.e., the control operation of promoting the start of the increase in the supercharging pressure if the power-on upshift is performed.

FIG. 4 is a flowchart for explaining a main portion of the control operation of the electronic control device 52, i.e., the control operation of increasing the supercharging pressure Pcmout if the power-on upshift is performed, and is repeatedly executed with an extremely short cycle time, for example, on the order of a few msec to a few tens of msec. The control operation depicted in FIG. 4 is performed solely or concurrently with another control operation.

First, at step (hereinafter, "step" will be omitted) SA1, the gear ratio γat of the automatic transmission 12, the accelerator opening degree Acc, and the vehicle speed V are acquired to calculate the request torque to the engine 10, i.e., the target engine torque Tet, based on the gear ratio γat, the accelerator opening degree Acc, and the vehicle speed V. SA1 is followed by SA2.

At SA2, it is determined whether the power-on upshift is performed. If the determination of SA2 is affirmative, i.e., if the power-on upshift is performed, the operation goes to SA3. On the other hand, if the determination of SA2 is negative, the operation returns to SA1. SA1 and SA2 correspond to the power-on upshift determining means 100.

At SA3 corresponding to the shift end time request torque calculating means 102, the target engine torque Tet at the end of the power-on upshift, i.e., the target engine torque Tet (predicted value) at the end of the upshift of the automatic transmission 12, is calculated. SA3 is followed by SA4.

At SA4 corresponding to the supercharging necessity determining means 104, it is determined whether the supercharging pressure Pcmout at the end of the upshift is increased in the power-on upshift as compared to the start of the upshift based on the target engine torque Tet at the end of the upshift calculated at SA3. In other words, it is determined whether the supercharging pressure Pcmout must be increased so as to realize the target engine torque Tet at the end of the upshift calculated at SA3. If the determination of SA4 is affirmative, i.e., if the supercharging pressure Pcmout must be increased so as to realize the target engine torque Tet at the end of the upshift calculated at SA3, the operation goes to SA5. On the other hand, if the determination of SA4 is negative, the flowchart is terminated.

At SA5, a time required for realizing the target engine torque Tet at the end of the upshift calculated at SA3, i.e., the torque increase required time, is calculated. SA5 is followed by SA6.

At SA6, a time required until the end of the upshift, i.e., the shift required time, is calculated. SA6 is followed by SA7.

At SA7, it is determined whether the supercharging pressure Pcmout can be increased before the end of the upshift to the magnitude required for generating the target engine torque Tet at the end of the upshift calculated at SA3. In other words, it is determined whether the target engine torque Tet at the end of the upshift calculated at SA3 can be realized before the end of the upshift. Specifically, if the torque increase required time is longer than the shift required time, it is determined that the target engine torque Tet at the end of the upshift calculated at SA3 cannot be realized before the end of the upshift. Conversely, if the torque increase required time is equal to or less than the shift required time, it is determined that the target engine torque Tet at the end of the upshift calculated at SA3 can be realized before the end of the upshift. If the determination of SA7 is affirmative, i.e., if the target engine torque Tet at the end of the upshift calculated at SA3 can be realized before the end of the upshift, the operation goes to SA8. On the other hand, if the determination of SA7 is negative, the operation goes to SA9. SA5 to SA7 correspond to the shift end time request torque determining means 106.

At SA8, the supercharging pressure increase early start control is provided. The increase in the supercharging pressure Pcmout is started through the supercharging pressure increase early start control to increase the supercharging pressure Pcmout and make the engine torque Te larger such that the target engine torque Tet at the end of the upshift calculated at SA3 is acquired before the end of the upshift. Therefore, at SA8, a start of supercharging is requested so as to realize the target engine torque Tet at the end of the upshift calculated at SA3. For example, the supercharging pressure increase early start control is provided by actuating the waist gate valve 68.

At SA9, the maximum engine torque Te realizable before the end of the upshift, i.e., the predetermined engine torque T1et, is calculated and determined. The target supercharging pressure PTcmout corresponding to the predetermined engine torque T1et is also determined. SA9 is followed by SA10.

At SA10, after the target supercharging pressure PTcmout at the end of the upshift in the supercharging pressure increase early start control is replaced with the target supercharging pressure PTcmout determined at SA9, the supercharging pressure increase early start control is provided. Specifically, the increase in the supercharging pressure Pcmout is started through the supercharging pressure increase early start control to increase the supercharging pressure Pcmout and make the engine torque Te larger such that the predetermined engine torque T1et calculated at SA9 is acquired before the end of the upshift. Therefore, at SA10, a start of supercharging is requested so as to realize the predetermined engine torque T1et calculated at SA9. When the predetermined engine torque T1et is acquired, the predetermined engine torque T1et is retained without change even if the upshift ends. The predetermined engine torque T1et is kept retained until the target engine torque Tet is reduced to be equal to or less than the predetermined engine torque T1et after the end of the upshift. SA8 to SA10 correspond to the torque-up control means 108.

Figure 5:
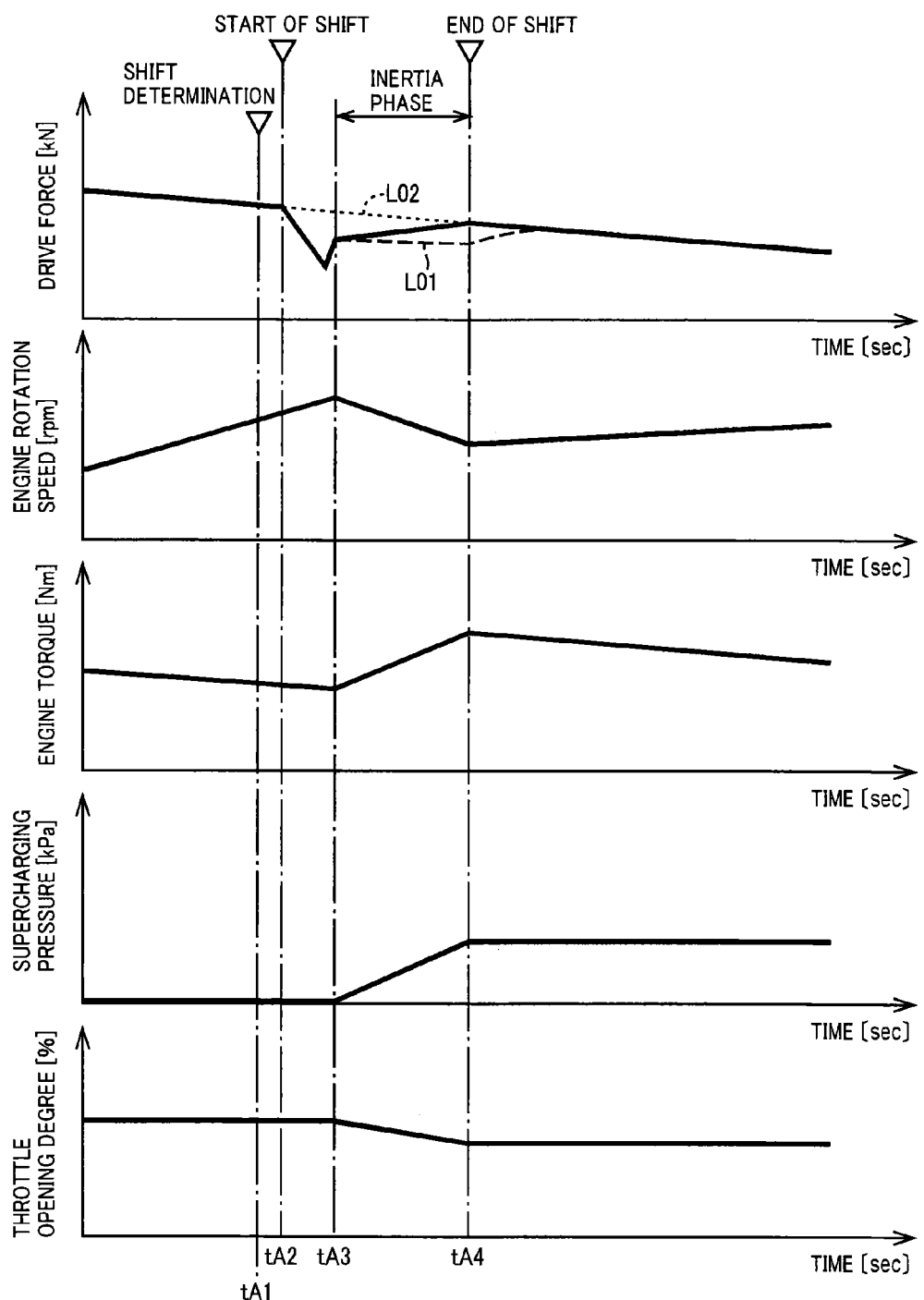
FIG. 5 is the first time chart for explaining the flowchart of FIG. 4, i.e., a time chart for explaining a change in the engine torque when the determination of SA7 of FIG. 4 is affirmative by taking as an example the case of performing the power-on upshift from an nth speed to an n+1st speed.

FIG. 5 is a time chart for explaining a change in the engine torque Te when the determination of SA7 of FIG. 4 is affirmative by taking as an example the case of performing the power-on upshift from an nth speed to an n+1st speed. An upshift of the automatic transmission 12 performed in FIG. 5 is a shift performed by switching the clutches C or the brakes B to be gripped included in the automatic transmission 12, i.e., the clutch-to-clutch shift, such as a shift from the third speed to the fourth speed of the automatic transmission 12, for example. In FIG. 5, the accelerator pedal 88 is sufficiently depressed for accelerating the vehicle 6 and the accelerator opening degree Acc is kept constant from beginning to end. Since the vehicle 6 is accelerated from beginning to end, the target drive force Fct calculated from the drive force characteristic map gradually decreases as time elapses. In the time chart of the drive force Fc, a solid line indicates a change in the drive force Fc when the supercharging pressure increase early start control is provided, and a broken line L01 indicates a change in the drive force Fc when the supercharging pressure increase early start control is not provided. A broken line L02 indicates a change in the target drive force Fct and the drive force Fc indicated by the solid line is identical to the target drive force Fct indicated by the broken line L02 before time tA2 and after time tA4.

In FIG. 5, time tA1 is a time when a shift determination is made for performing an upshift of the automatic transmission 12 that is the power-on upshift. Time tA2 is a start time of the upshift based on the shift determination. Time tA3 is a start time of the inertia phase of the upshift and time tA4 is an end time of the inertia phase, i.e., an end time of the upshift. The shift control of the upshift is the same regardless of whether the supercharging pressure increase early start control is provided. In other words, the start time (time tA2) and the end time (tA4) of the upshift are kept regardless of the supercharging pressure Pcmout.

In the time chart of FIG. 5, at time tA1, the determination of SA2 of FIG. 4 is affirmative and the determination of SA4 is affirmative. The determination of SA7 is also affirmative. Therefore, since the supercharging pressure increase early start control is provided at SA8 of FIG. 4, the increase in the supercharging pressure Pcmout is started from an initial period of the shift start of the upshift. Specifically, the increase in the supercharging pressure Pcmout is started from the start of the inertia phase (time tA3). As a result, at the end of the upshift (time tA4), the engine torque Te reaches the target engine torque Tet corresponding to the target drive force Fct and, therefore, the drive force Fc reaches the target drive force Fct. After the end of the upshift, the drive force Fc gradually decreases in accordance with the drive force characteristic map as the vehicle speed V increases. Therefore, this avoids drive force variation in which the drive force Fc becomes larger after the shift even though the vehicle speed V increases under the constant accelerator opening degree $A_{CC}$, i.e., drive force variation giving a sense of discomfort to a driver.

On the other hand, if the supercharging pressure increase early start control is not provided, the supercharging pressure Pcmout increases after time tA4. As a result, as indicated by the broken line L01, this generates drive force variation in which the drive force Fc temporarily becomes larger after time tA4, i.e., after the upshift. Therefore, drive force variation is generated that gives a sense of discomfort to the driver.

Figure 6:
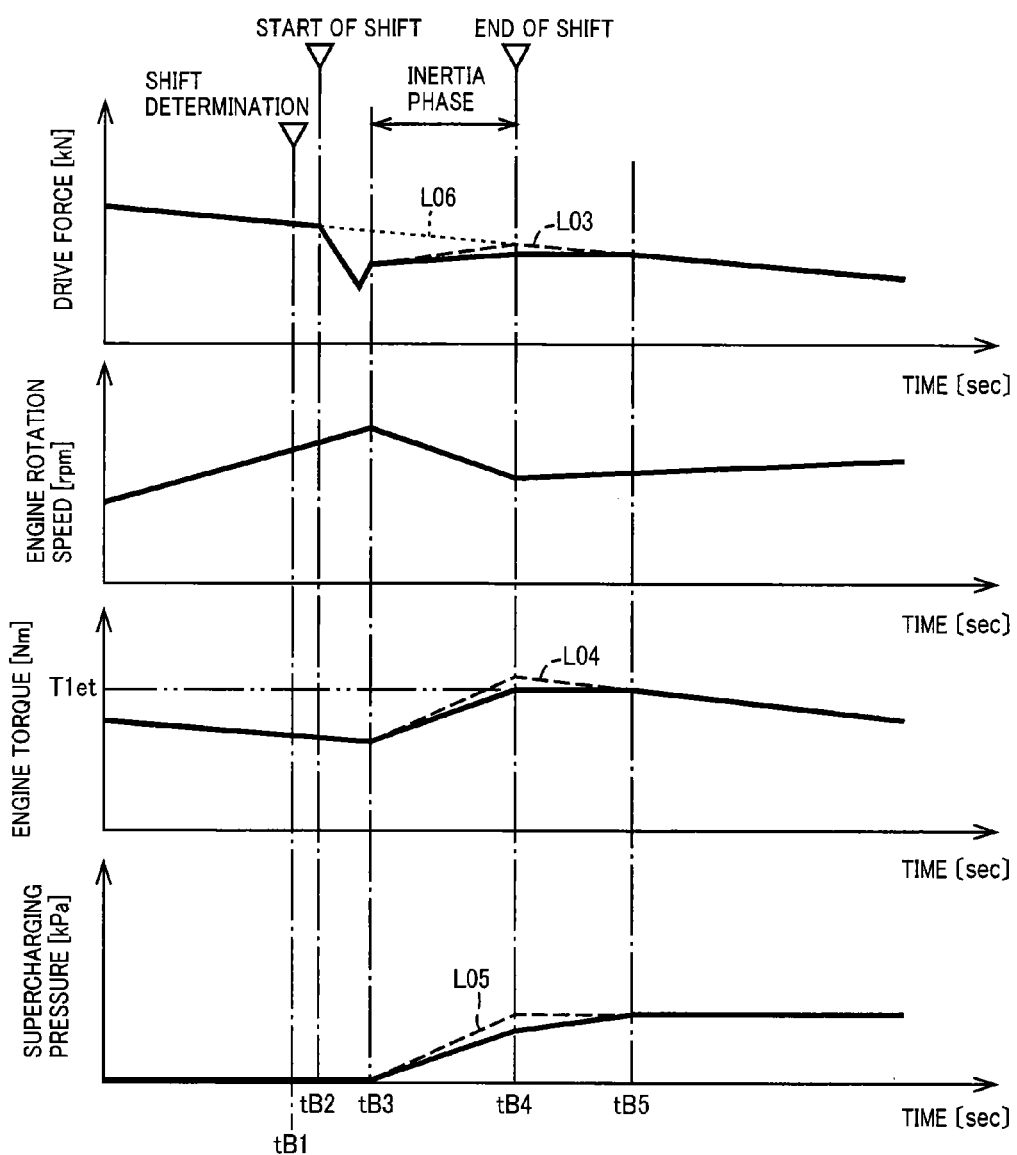
FIG. 6 is the second time chart for explaining the flowchart of FIG. 4, i.e., a time chart for explaining a change in the engine torque when the determination of SA7 of FIG. 4 is negative by taking as an example the case of performing the power-on upshift from an nth speed to an n+1st speed.

FIG. 6 is a time chart for explaining a change in the engine torque Te when the determination of SA7 of FIG. 4 is negative by taking as an example the case of performing the power-on upshift from an nth speed to an n+1st speed. An upshift of the automatic transmission 12 performed in FIG. 6 is the clutch-to-clutch shift as is the case with the example of FIG. 5. Also in FIG. 6, as is the case with the example of FIG. 5, the accelerator pedal 88 is sufficiently depressed for accelerating the vehicle 6 and the accelerator opening degree Acc is kept constant from beginning to end. Since the vehicle 6 is accelerated from beginning to end, the target drive force Fct calculated from the drive force characteristic map gradually decreases as time elapses. In the time charts of the drive force Fc, the engine torque Te, and the supercharging pressure Pcmout of FIG. 6, a solid line indicates the case that the determination of SA7 of FIG. 4 is negative, and broken lines L03, L04, and L05 indicate the case that the determination of SA7 is hypothetically affirmative. A broken line L06 indicates a change in the target drive force Fct and the drive force Fc indicated by the solid line is identical to the target drive force Fct indicated by the broken line L06 before time tB2 and after time tB5.

In FIG. 6, time tB1 is a time when a shift determination is made for performing an upshift of the automatic transmission 12 that is the power-on upshift. Time tB2 is a start time of the upshift based on the shift determination. Time tB3 is a start time of the inertia phase of the upshift and time tB4 is an end time of the inertia phase, i.e., an end time of the upshift. In FIG. 6, as is the case with FIG. 5, the start time (time tB2) and the end time (tB4) of the upshift are kept regardless of the supercharging pressure Pcmout.

In the time chart of FIG. 6, at time tB1, the determination of SA2 of FIG. 4 is affirmative and the determination of SA4 is affirmative. The determination of SA7 is negative. Therefore, SA10 of FIG. 4 is executed. Thus, as is the case with FIG. 5, the increase in the supercharging pressure Pcmout is started from the start of the inertia phase (time tB3). However, unlike FIG. 5, at SA9 of FIG. 4, the maximum engine torque Te realizable before the end of the upshift (time tB4) is calculated as the predetermined engine torque T1et and, at SA10, the supercharging pressure Pcmout is increased and the engine torque Te is made larger such that the predetermined engine torque T1et is acquired before the end of the upshift. In FIG. 6, the engine torque Te reaches the predetermined engine torque T1et at time tB4, and the engine torque Te at time tB4, i.e., the predetermined engine torque T1et, is retained after time tB4. The target engine torque Tet corresponding to the target drive force Fct decreasing in accordance with an increase in the vehicle speed V is reduced to the predetermined engine torque T1et at time tB5. As a result, the retaining of the predetermined engine torque T1et started from time tB4 is terminated at time tB5. In other words, the predetermined engine torque T1et is retained from time tB4 to time tB5. After time tB5, as is the case with FIG. 5, the drive force Fc gradually decreases in accordance with the drive force characteristic map as the vehicle speed V increases. Therefore, this avoids drive force variation in which the drive force Fc becomes larger after the shift even though the vehicle speed V increases under the constant accelerator opening degree $A_{CC}$ also in the example of FIG. 6 as is the case with FIG. 5. Although the supercharging pressure Pcmout is increased between time tB4 and time tB5, the retaining of the predetermined engine torque T1et is continued through adjustment of the throttle opening degree θth.

As described above, according to this example, when the supercharging pressure Pcmout at the end of the upshift is increased as compared to the start of the upshift such that the engine torque Te at the end of the upshift of the automatic transmission 12 is made larger than that at the start of the upshift, the electronic control device 52 sets the target supercharging pressure PTcmout depending on the predicted engine operation state predicted at the end of the upshift and allows the shift operation of the automatic transmission 12 to proceed while starting an increase in the supercharging pressure Pcmout before the completion of the upshift such that the supercharging pressure Pcmout reaches the target supercharging pressure PTcmout. Therefore, although a temporal delay occurs in an increase in the supercharging pressure Pcmout, the increase in the supercharging pressure Pcmout is started early before the completion (before the end) of the upshift and, therefore, a request for drive force from a driver can more easily be satisfied at the end of the upshift. As compared to when the increase in the supercharging pressure Pcmout is started after the upshift ends, it is more easily avoided or suppressed that the drive force Fc is not made sufficiently larger at the end of the upshift and that the drive force Fc is made larger with a delay from the end of the upshift and, as a result, a sense of discomfort given to a driver can be reduced. Thus, drivability at the time of the upshift can be improved.

According to this example, the increase in the supercharging pressure Pcmout in the supercharging pressure increase early start control is preferably started before the start of an inertia phase of the upshift of the automatic transmission 12. In this case, as compared to when the increase in the supercharging pressure Pcmout is started after the start of the inertia phase, a sufficient grace period for increasing the supercharging pressure Pcmout before the end of the upshift can easily be ensured.

According to this example, when the determination of SA4 of FIG. 4 is affirmative, if the supercharging pressure Pcmout cannot be increased in an upshift of the automatic transmission 12 before the end of the upshift to the magnitude required for generating the target engine torque Tet at the end of the upshift, the electronic control device 52 retains the predetermined engine torque T1et lower than the target engine torque Tet at the end of the upshift, after the end of the upshift. Therefore, it is avoided that the drive force Fc is made larger with a delay from the end of the upshift in accordance with an increase in the supercharging pressure and, as a result, a sense of discomfort given to a driver can be reduced.

According to this example, the retaining of the predetermined engine torque T1et performed in the case of negative determination of SA7 of FIG. 4 is performed until the target engine torque Tet is reduced to be equal to or less than the predetermined engine torque T1et after the end of the upshift. Therefore, after the end of the upshift, the drive force Fc can smoothly be changed while a sense of discomfort given to a driver is suppressed.

Although the example of the present invention have been described in detail with reference to the drawings, this is merely an embodiment and the present invention can be implemented in variously modified and improved forms based on the knowledge of those skilled in the art.

For example, although the flowchart of FIG. 4 includes SA5 to SA7, SA9, and SA10 in the example, the flowchart may not include SA5 to SA7, SA9, and SA10 and, if the determination of SA4 is affirmative, SA8 may be executed.

Although the retaining of the predetermined engine torque T1et performed in the case of negative determination of SA7 of FIG. 4 is performed until the target engine torque Tet is reduced to be equal to or less than the predetermined engine torque T1et after the end of the upshift of the automatic transmission 12 in the example, the retaining may be terminated when a predetermined time elapses from the end of the upshift, for example, and the engine torque Te may be increased from the predetermined engine torque T1et toward the target engine torque Tet at a predetermined increase rate to the extent that a sense of discomfort is not given to a driver.

Although the supercharging pressure Pcmout starts increasing from the start time point of the inertia phase of the upshift according to the time charts of FIGS. 5 and 6 in the example, the supercharging pressure Pcmout may start increasing before the start time point of the inertia phase, for example, from the start time point of the upshift or the time point of shift determination of the upshift, or may start increasing after the start time point of the inertia phase.

Although the time charts of FIGS. 5 and 6 represent examples that the automatic transmission 12 performs the clutch-to-clutch shift in the example, it is not essential that the shift of the automatic transmission 12 is the clutch-to-clutch shift.

Although an upshift for changing gears by one stage is exemplarily illustrated in the time charts of FIGS. 5 and 6 in the example, the supercharging pressure increase early start control may be provided at the time of an upshift for changing gears by two or more stages.

Although the vehicle 6 does not include an electric motor as a drive force source for running in the example, the vehicle may be a hybrid vehicle including an electric motor for running.

Although the vehicle 6 includes the torque converter 14 as depicted in FIG. 1 in the example, the torque converter 14 is not essential.

Although the supercharger 54 is an exhaust turbine supercharger in the example, the supercharger 54 may be a mechanical type supercharger, i.e., mechanical supercharger, rotationally driven by rotation of the output shaft 13 of the engine 10.

Although the torque-up control means 108 starts the increase in the supercharging pressure Pcmout before the completion of the upshift such that the supercharging pressure Pcmout reaches the target supercharging pressure PTcmout defined from the predicted engine operation state at the end of the upshift in the example, the target supercharging pressure PTcmout may be the pressure at a predetermined time point after the end of the upshift. Therefore, the torque-up control means 108 may start the increase in the supercharging pressure Pcmout before the completion of the upshift such that the supercharging pressure Pcmout reaches the target supercharging pressure PTcmout defined from the predicted engine operation state after the upshift.

NOMENCLATURE OF ELEMENTS

6: vehicle 7: vehicle drive device 10: engine 12: automatic transmission 38: drive wheels 52: electronic control device (control device) 54: supercharger

The invention claimed is:

1. A control device of a vehicle drive device including an engine having a supercharger and an automatic transmission outputting power of the engine to drive wheels,
    when a supercharging pressure at an end of an upshift is increased as compared to a start of the upshift such that an engine torque at the end of the upshift of the automatic transmission is made larger than that at the start of the upshift, a target supercharging pressure being set depending on a predicted engine operation state after the upshift to allow a shift operation to proceed while an increase of the supercharging pressure is started before a completion of the upshift such that the supercharging pressure reaches the target supercharging pressure,
    the supercharging pressure being controlled such that a target engine torque determined based on a vehicle state is achieved, and
    when the supercharging pressure cannot be increased in the upshift before the end of the upshift to a magnitude required for generating the target engine torque at the end of the upshift, a predefined engine torque lower than the target engine torque at the end of the upshift being retained after the end of the upshift.

2. The control device of a vehicle drive device of claim 1, wherein
    the increase in the supercharging pressure is started before a start of an inertia phase of the upshift of the automatic transmission.

3. The control device of a vehicle drive device of claim 1, wherein
    the predefined engine torque is retained until the target engine torque is reduced to be equal to or less than the predefined engine torque after the end of the upshift.

* * * * *